Oct. 15, 1946.　　　　　C. E. BENNETT　　　　　2,409,531
ELECTRODE FOR BUOYANT CABLES
Original Filed Feb. 22, 1943
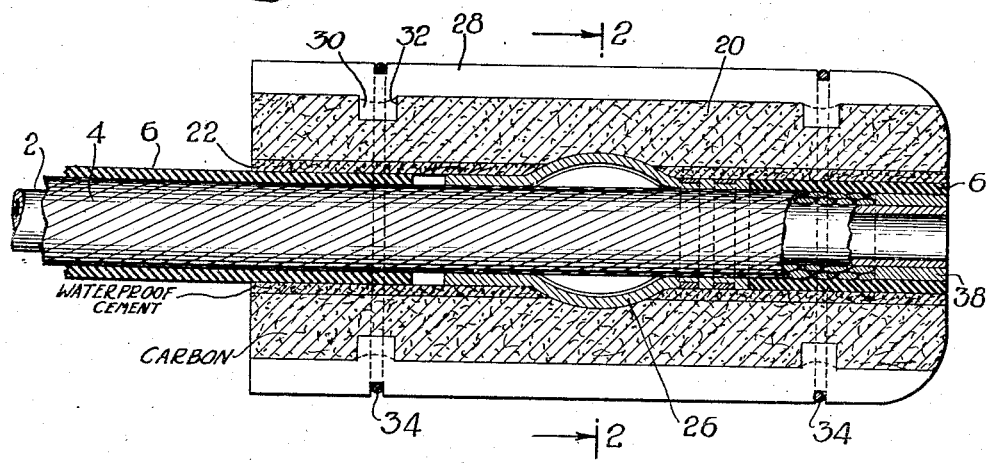
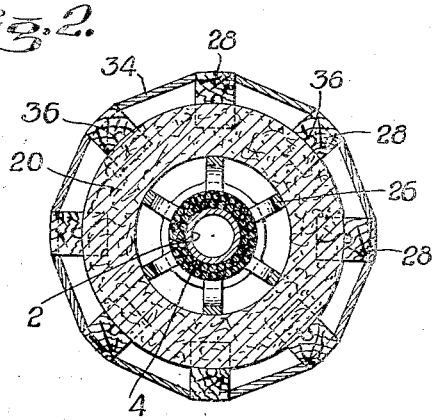
INVENTOR
Charles E. Bennett
BY
James C. Burdge
ATTORNEY.

Patented Oct. 15, 1946

2,409,531

UNITED STATES PATENT OFFICE 2,409,531

ELECTRODE FOR BUOYANT CABLES

Charles E. Bennett, Ridgewood, N. J., assignor to The Okonite-Callender Cable Company, Incorporated, Paterson, N. J., a corporation of New Jersey Original application February 22, 1943, Serial No. 476,741. Divided and this application March 29, 1944, Serial No. 528,519

6 Claims. (Cl. 174—77)

This invention relates to electrodes for buoyant electric cables, and has for one of its objects to provide an electrode which is of such construction that electrolytic decomposition of the same is substantially eliminated.

It is to be understood that buoyant electric cables and electrodes therefor are, in so far as this invention is concerned, cable and electrode structures in which the volume to weight ratio is such as to enable the same to float in a medium such as sea water.

In the accompanying drawing wherein an embodiment of my invention has been illustrated:

Fig. 1 is a sectional elevational view of my improved electrode; and

Fig. 2 is a section on the line 2—2 of Fig. 1.

Referring to the drawing in detail: 2 designates a tubular core or center member, which is water-impervious, electrically insulating, and flexible. This tube may be composed of various materials. However, I suggest a material known commercially as Saran, a thermoplastic formed by the copolymerization of vinylidene and vinyl chlorides.

The tube 2 is continuous, extending the length of the electrode and its cooperating cable.

4 is a continuous electric conductor which is common to the cable and electrode. This conductor preferably is composed of small strands or wires stranded about the tubing or core 2.

6 is a flexible tubing of rubber or rubber-like insulating and water-impervious material which surrounds the conductor 4.

Surrounding the tubing 6 is electrode element 20. This element has been illustrated as substantially cylindrical in form. This is for purposes of description, as obviously this element might be spherical, for example, or other shape.

It is necessary that this element be in electrical contact with the conductor 4, so as to provide an electrically conducting path from the conductor to the water in which the electrode is floating. I provide for this by interrupting the continuity of the tubing 6 intermediate the ends of the electrode element, and providing the conductor at this gap with a spring metal clip 26, which is of sufficient dimensions externally as to contact the electrode element with sufficient pressure to maintain an electrical conducting path at all times from conductor 4, through the clip 26, carbon particles composing the electrode element, to the water in which the electrode is floating.

While an electrically conductng path must be provided from conductor to water, it will be appreciated that no water must be allowed to reach the conductor. Accordingly I seal the electrode element in place by suitable waterproof cement 22. This prevents seepage of water between the electrode element and the tubing 6. In addition to this precaution, I treat the electrode element itself to render it waterproof. For example, I may impregnate it with paraffin.

It will be appreciated that the construction just described prevents the entry of any water or moisture to the conductor, yet I provide an electrically conducting path from the conductor to the water in which the electrode is floating which will be maintained almost indefinitely in that the rate of electrolytic decomposition of carbon is notoriously low.

It will be appreciated that the electrode elements 20 will be strung at desired intervals along the tubing 6 and in order that sea water may not enter the tubing 6 at the outer end of the terminal electrode element, I seal the tube 6 in any suitable fashion, as indicated at 38, for example.

The Saran tubing 2 is for passing a coolant through the center of the conductor, and because this tubing is water-impervious, I may employ water as a coolant if I so desire without the risk of contacting the conductor, and it will be apparent from the drawing that the seal 38 does not interfere with the free passage of the coolant through the tubing 2.

As above pointed out, the electrode elements 20 are threaded upon the tubing 6 at suitable intervals, and for buoyancy purposes it would be feasible to provide the tubing 6 with wooden floats between adjacent electrode elements. However, for economical reasons and for purposes of mechanically protecting the electrode elements against injury, I prefer a construction such as illustrated in the drawing. This construction comprises wooden battens 28 disposed at spaced intervals on the exterior of the electrode element. These battens may be provided with ribs 30 on their lower face, received by grooves 32 provided for that purpose in the periphery of the element. The battens may be bound in place by windings 34 of a suitable twine, such as twine of the Saran above referred to, for example. The construction just described reduces the contact area at the exterior of the electrode elements, this reduction is not sufficient to defeat my purpose, and if desired may be compensated for by grooving each batten from end to end as shown at 36.

It will be seen from all of the foregoing that this invention provides an electrode construction in which the weight to volume ratio is such as to enable the same to float in a medium such as sea water, means being provided, however, for preventing the passage of water to the conductor at the interior of the electrode element, yet maintaining an electrically conducting path from the conductor to the water in which the electrode is floated. It will be appreciated also that the electrode element itself is of such a nature that its electrolytic decomposition is substantially nil. It will be appreciated also that despite the fact that the electrode element is of carbon it is well protected against mechanical injury, from striking floating objects, handling on shipboard, reeling, etc.

This application is a division of my copending application Serial No. 476,741, filed February 22, 1943.

What I claim is:

1. An electrode for buoyant electric cables, said electrode comprising in combination a central conductor, electrically insulating water impervious-tubing surrounding the conductor, an electrode element of electrically conducting water-proofed material strung upon said tubing, and a spring metal electrical contact element within the interior of the electrode and electrically connecting the conductor and electrode element.

2. An electrode for buoyant electric cables, said electrode comprising in combination a central conductor, electrically insulating water-impervious tubing surrounding the conductor, an electrode element of electrically conducting water-proofed material strung upon said tubing and hermetically sealed thereto, and a spring metal electrical contact element within the interior of the electrode and electrically connecting the conductor and electrode element.

3. An electrode for buoyant electric cables, said electrode comprising in combination a central conductor, a plurality of water-impervious electrode elements threaded upon the conductor, water-impervious, electrically insulating tubing surrounding the conductor and extending into each electrode element from each end thereof, the inner ends of said tubing terminating short of each other to provide an unsheathed conductor section within each electrode element, a contact at this unsheathed conductor portion contacting the conductor and the electrode element, and buoyant elements secured to the periphery of each electrode element, the weight to volume ratio of the electrode structure being such as to enable the same to float in sea water.

4. An electrode for buoyant electric cables, said electrode comprising in combination a central conductor, a plurality of carbon electrode elements threaded upon the conductor, each of said elements being impregnated to render it water-impervious, means for sealing the electrode elements to the conductor to prevent the entry of moisture between the electrode elements and the conductor, a spring metal contact within each electrode element for maintaining an electrical connection between the electrode elements and said conductor, and buoyant elements secured to the exterior of the electrode elements, the weight to volume ratio of the structure being such as to enable the same to float in sea water.

5. An electrode for buoyant electric cables, said electrode comprising in combination a continuous central conductor laid up about a water-impervious tube, an enclosing water-impervious, non-metallic sheath for said conductor, a plurality of carbon electrode elements strung upon said sheath, waterproof material filling the interstices of said elements, a water-impervious seal between the said electrode elements and said sheath, a spring metal contact within each electrode element contacting the conductor and the element, and buoyant members secured to the exterior of each electrode element, the weight to volume ratio of the entire structure being such as to enable the same to float in sea water.

6. An electrode for buoyant electric cables, said electrode comprising in combination a continuous central conductor laid up about a water-impervious tube, an enclosing water-impervious, non-metallic sheath for said conductor, a plurality of carbon electrode elements strung upon said sheath in spaced relation to each other, paraffin filling the interstices of the electrode elements, a water-impervious seal between the said electrode elements and said sheath, a contact at the interior of each of said electrode elements in constant engagement with the cable conductor, non-metallic buoyant members carried at the exterior of each of said electrode elements, and sealing means at the outer end of said tube for preventing the contact of water with the end of the conductor while permitting of the passage of water through the tube.

CHARLES E. BENNETT.